(12) United States Patent
Hu et al.

(10) Patent No.: US 10,452,929 B2
(45) Date of Patent: Oct. 22, 2019

(54) ILLUMINATION STANDARD CALCULATION METHOD AND SYSTEM FOR A TUNNEL ENTRANCE SECTION IN DAYTIME BASED ON SAFE VISUAL RECOGNITION

(71) Applicants: Beijing University Of Technology (CN), Beijing (CN); Guizhou Expressway Group Co., Ltd. (CN), Guizhou (CN)

(72) Inventors: Jiangbi Hu, Beijing (CN); Wenqian Ma, Beijing (CN); Shilong Mei, Beijing (CN); Xiaoshun Lu, Beijing (CN); Jianping Cao, Beijing (CN); Weili Wang, Beijing (CN); Yuanfeng Zhang, Beijing (CN); Xiaoqin Zhang, Beijing (CN); Da Guo, Beijing (CN); Meng Wang, Beijing (CN); Xiaoyu Li, Beijing (CN); Linxi Gao, Beijing (CN); Xiaojuan Gao, Beijing (CN); Feng Liu, Beijing (CN)

(73) Assignees: Beijing University of Technology (CN), Beijing (CN); Guizhou Expressway Group Co., LTD (CN), Guizhou (CN)

( * ) Notice: Subject to any disclaimer, the term of this patent is extended or adjusted under 35 U.S.C. 154(b) by 184 days.

(21) Appl. No.: 15/520,592

(22) PCT Filed: Oct. 15, 2015

(86) PCT No.: PCT/CN2015/091962
§ 371 (c)(1),
(2) Date: Apr. 20, 2017

(87) PCT Pub. No.: WO2016/066018
PCT Pub. Date: May 6, 2016

(65) Prior Publication Data
US 2018/0307918 A1  Oct. 25, 2018

(30) Foreign Application Priority Data

Oct. 26, 2014  (CN) .......................... 2014 1 0580369

(51) Int. Cl.
*G06K 9/00* (2006.01)
*H05B 37/02* (2006.01)
(Continued)

(52) U.S. Cl.
CPC ......... *G06K 9/00798* (2013.01); *B60W 40/06* (2013.01); *G06K 9/4652* (2013.01);
(Continued)

(58) Field of Classification Search
CPC ............ G06K 9/00798; G06K 9/4661; G06K 9/4652; B60W 40/06; H05B 37/0218; Y02B 20/46
(Continued)

(56) References Cited

U.S. PATENT DOCUMENTS

2011/0156925 A1   6/2011  Lee et al.

FOREIGN PATENT DOCUMENTS

CN          101938878 A        5/2011
CN          102103015 A        6/2011
(Continued)

OTHER PUBLICATIONS

State Intellectual Property Office of the P.R. China, International Search Report and Written Opinion of the International Searching Authority for PCT/CN2015/091962, dated Jan. 7, 2015, 12 Pages, Beijing, CN.
(Continued)

*Primary Examiner* — Amandeep Saini
(74) *Attorney, Agent, or Firm* — Taft Stettinius & Hollister LLP; Stephen F. Rost

(57) ABSTRACT

The invention relates to an illumination standard calculation method for a tunnel entrance section in daytime based on
(Continued)

safe visual recognition. The method includes: (a) setting light environment parameters of the tunnel entrance section; (b) determining a feature position in the tunnel, and measuring the average road surface brightness L of the feature position; (c) placing a target object in the feature position and then making a driver drive at different speeds from outside the tunnel towards the target object to measure visual recognition distances D required by the driver to visually discover the target object under different driving speeds, and measuring the road surface brightness $L_{20}$ at the position where the driver visually discovers the target object and calculating the brightness reduction factor K to be the ratio between L and $L_{20}$; (d) resetting the average road surface brightness L of the tunnel entrance section and repeating steps (b) and (c) to obtain a plurality of different sets of visual recognition distances D and corresponding brightness reduction factors K; (e) using Sigmoid function model to calculate and fit the data of the plurality of sets of D and K to obtain a relational model formula of D and K:

$$D = \frac{215}{1 + e^{(-708+56)}} + 27.6;$$

(f) substituting a safe stopping sight distance $D_0$ corresponding to a maximum speed limit of the tunnel into the formula to obtain the minimum brightness reduction factor $K_0$ of the tunnel entrance section in daytime. The invention also relates to a system for implementing the illumination standard calculation method for a tunnel entrance section in daytime based on safe visual recognition.

10 Claims, 3 Drawing Sheets

(51) Int. Cl.
*B60W 40/06* (2012.01)
*G06K 9/46* (2006.01)

(52) U.S. Cl.
CPC ....... *G06K 9/4661* (2013.01); *H05B 37/0218* (2013.01); *Y02B 20/46* (2013.01)

(58) Field of Classification Search
USPC ......................................................... 382/103
See application file for complete search history.

(56) References Cited

FOREIGN PATENT DOCUMENTS

| | | | |
|---|---|---|---|
| CN | 102595679 A | 7/2012 | |
| CN | 104266823 A | 1/2015 | |
| CN | 104296967 A | 1/2015 | |
| CN | 104316171 A | 1/2015 | |
| CN | 104533441 A | 4/2015 | |
| CN | 204630714 U | 9/2015 | |
| EP | 2373127 A2 * | 10/2011 | ......... H05B 37/0227 |
| JP | 2014022090 A | 2/2014 | |
| WO | 98/38839 A1 | 9/1998 | |

OTHER PUBLICATIONS

First Chinese Office Action for CN201410580369.4, State Intellectual Property Office of the People's Republic of China, dated Mar. 3, 2016, 8 total pages (including English translation).

Second Chinese Office Action for CN201410580369.4, State Intellectual Property Office of the People's Republic of China, dated Sep. 14, 2016, 8 total pages (including English translation).

Third Chinese Office Action for CN201410580369.4, State Intellectual Property Office of the People's Republic of China, dated Mar. 27, 2017, 5 total pages (including English translation).

Investigations on the Required Luminance in Tunnel Entrances, W. Adrian, Dr. -Ing, Lighting Research & Technology, vol. 14, No. 3, pp. 151-159, 1982.

Extended European Search Report, European Patent Office, European Patent Application Ser. No, 15853969.2, 11 pages, dated Aug. 23, 2017.

* cited by examiner

ILLUMINATION STANDARD CALCULATION METHOD AND SYSTEM FOR A TUNNEL ENTRANCE SECTION IN DAYTIME BASED ON SAFE VISUAL RECOGNITION

TECHNICAL FIELD

The invention relates to the technical field of highway tunnel illumination, especially relates to an illumination standard calculation method and system for a tunnel entrance section in daytime based on safe visual recognition.

BACKGROUND

Highway tunnel illumination aims at creating a good light environment for safe and efficient tunnel traffic, ensuring the visibility of the tunnel road surface and the visual ability of the driver, meeting the needs of the driver to quickly get plenty of information from the environment and avoiding traffic accidents caused by lack of visual information. The illumination condition of the tunnel entrance section has a direct effect on the visual characteristics of the driver in daytime. The unreasonable design of lighting level will lead to drastic change of light environment between inside and outside of the tunnel, which causes the "black hole effect" to appear. The driver will suffer from the visual lag phenomenon, resulting in driver's visual recognition difficulty and nervousness. It will lead to wrong driving behavior which tends to induce traffic accidents. For this kind of problem, people at home and abroad put forward various lighting designs of the entrance section in daytime, but there are still some problems.

At home and abroad, there are many problems in the lighting design of the tunnel entrance section in daytime. Only the brightness index is considered, with lack of consideration of light source characteristics such as color temperature and color rendering index. The design index is too simple to meet the actual needs of the driver under various illumination conditions of different light source characteristics such as different color temperatures and different color rendering indexes, which reduces the safety service level of tunnel operation. Static measuring methods are adopted to study the characteristics of the illumination light source and visual recognition of small targets in the tunnel entrance section, and the reliability of the research results is limited. There is still a lack of a reasonable illumination standard test and calculation method for the tunnel entrance section under a certain design speed or under a certain speed limit. In order to improve the safety, stability and comfort, it is needed to find a method and system for measuring and calculating the illumination standard of a tunnel entrance section under various light source characteristics that is able to be used in an actual driving process, especially for a tunnel entrance section in daytime.

SUMMARY OF THE INVENTION

An objective of the invention is to solve the above-mentioned technical defects existing in the prior art. An illumination standard calculation method for a tunnel entrance section in daytime based on safe visual recognition is provided, with multiple indexes, dynamic measurement, high reliability and meeting the actual needs of the driver. At the same time, the invention also provides an illumination standard calculation system which is compact and easy to operate, and the system can implement the illumination standard calculation method for a tunnel entrance section in daytime based on safe visual recognition. This system provides a variety of light environment variables, and can measure these variables dynamically, thus it can overcome the shortcomings of the traditional measurement system which relies on one single index, has low reliability due to static measurement, and cannot meet the actual needs of driving.

In order to achieve the above-mentioned objective, a first aspect of the invention is to provide an illumination standard calculation method for a tunnel entrance section in daytime based on safe visual recognition. The calculation method comprises the following steps: (a) setting light environment parameters of the tunnel entrance section, including setting a color temperature in the tunnel to be $T_0$, setting the color rendering index to be $R_{a0}$, and setting the average brightness of the tunnel entrance section to be L; (b) determining a feature location in the tunnel where the road surface brightness in the tunnel begins to remain constant, and measuring the average road surface brightness L of the feature location in the tunnel; (c) placing a target object at the feature location in the tunnel, making a driver drive at different speeds from outside the tunnel toward the target object to measure a visual recognition distance D required by the driver to visually discover the target object under different driving speeds, and measuring the road surface brightness $L_{20}$ at the position where the driver visually discovers the target object and calculating the brightness reduction factor K to be the ratio between L and $L_{20}$; (d) resetting the average road surface brightness L of the tunnel entrance section and repeating the steps (b) and (c) to obtain a plurality of different sets of visual recognition distances D and corresponding brightness reduction factors K associated with different average road surface brightness; (e) based on the obtained plurality of sets of visual recognition distances D and corresponding brightness reduction factors K, using a Sigmoid function model to calculate and fit the data of the plurality of sets of D and K to obtain a relational model formula of D and K to be $$D = \frac{215}{1 + e^{(-708+56)}} + 27.6;$$

(f) substituting a safe stopping sight distance $D_0$ corresponding to a maximum speed limit designed for the tunnel into the formula to obtain the minimum brightness reduction factor $K_0$ of the tunnel entrance section in daytime.

Further, after the step (f), the method further comprises the following steps to calibrate the minimum brightness reduction factor $K_0$ required for the tunnel portal section in daytime: (g) setting the color temperature of the tunnel entrance section to be $T_0$ and setting the color rendering index to be $R_{a0}$; (h) determining a feature location in the tunnel where the illumination brightness in the tunnel begins to remain constant, placing a target object at the feature location in the tunnel, and parking a motor vehicle at a position that is spaced apart from the target object by the safe stopping sight distance $D_0$; (i) letting a driver enter the cab of the motor vehicle, adjusting the average road surface brightness L of the tunnel entrance section from small to large, recording the minimum static brightness value $L_f$ required by the driver to visually discover the target object, and measuring the average road surface brightness $L_{20}$ outside the tunnel at the safe stopping sight distance $D_0$ and calculating the static minimum brightness reduction factor $K_f$ to be the ratio between $L_f$ and $L_{20}$; (j) resetting at least one of the color temperature or the color rendering index of the tunnel entrance section and repeating the steps (h) and (i) to obtain the static minimum brightness reduction factors $K_f$ associated with different color temperatures and color rendering indexes, setting the static minimum brightness reduction factor $K_f$ associated with a color temperature $T_0$ and a color rendering index $R_{a0}$ as benchmark J, comparing J with static minimum brightness reduction factors $K_f$ associated with different color temperatures and color rendering indexes to obtain the visual calibration factors a associated with different color temperatures and color rendering indexes, and calculating the minimum brightness reduction factors $K_{Od}$ of the tunnel entrance section under different light environments to be an arithmetic product of a and $K_0$.

A second aspect of the invention provides a system for implementing the illumination standard calculation method for a tunnel entrance section in daytime based on safe visual recognition. The system includes a tunnel entrance subsystem that comprises illumination devices with adjustable output power installed at the tunnel entrance section for setting the tunnel light environment; a test subsystem that comprises a motor vehicle, a target object, an inside tunnel brightness measuring device, an outside tunnel brightness measuring device, a color temperature measuring device, a color rendering index measuring device, a speed measuring device, and a distance measuring device, for dynamic testing and static testing with data collection; a data computing subsystem that comprises a computer system for fitting and processing of the collected data.

The method and system of the invention takes into consideration the safety and comfort of visual recognition during driving, combined with the driver's visual recognition characteristics in the actual dynamic driving process, and obtains an illumination standard that meets the safe visual recognition requirements for a driver in different light environments, and achieves safe, comfortable, reasonable light environment setting for the tunnel entrance section in daytime. This method makes up for the blank of illumination standard study for a tunnel entrance section in daytime from the point of view of driving visual recognition demand. On the other hand, it can help to create a good, reliable and safe visual environment, make sure that the driver is able to approach and drive through the tunnel at design speed safely and comfortably, and reduce operation risks of tunnel traffic as well as energy consumption and costs of tunnel illumination. By calculating the illumination standard that meets the driver's continuous dynamic visual recognition requirements under different light environments with coupling action of the natural light source and the artificial light source at the tunnel entrance section, coordination and unification of illumination energy saving and traffic safety at the tunnel entrance section can be achieved.

BRIEF DESCRIPTION OF DRAWINGS

Referring to the accompanying drawings, more objectives, functions and advantages of the invention will be clarified in the following description of the embodiments of the invention, wherein.

Figure 1:
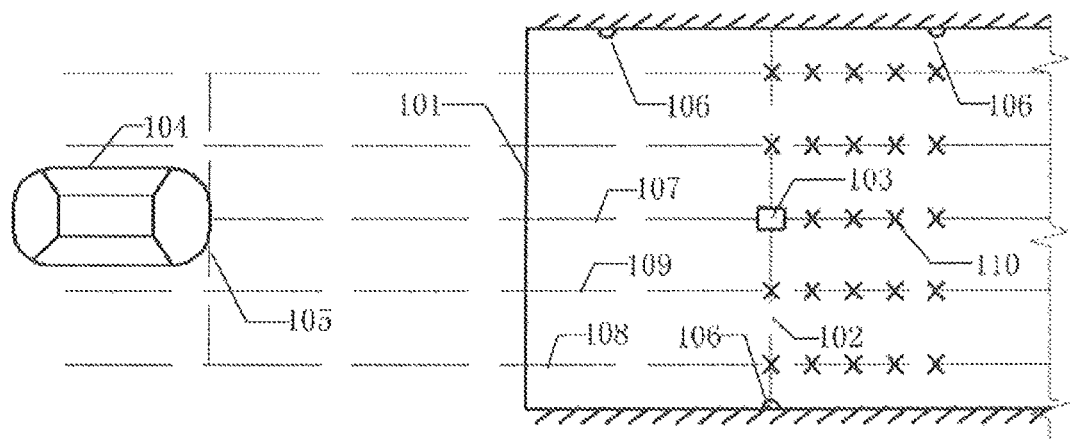
FIG. 1 is a schematic diagram of an embodiment of the illumination standard calculation method for a tunnel entrance section in daytime based on safe visual recognition.

Reference numerals:

100 tunnel entrance section
101 tunnel portal
102 feature position in the tunnel
103 target object
104 vehicle
105 feature position outside the tunnel
106 illumination device
107 middle line of the roadway
108 edge line of the roadway
109 lane dividing line of the roadway
110 position point

DETAILED DESCRIPTION OF SPECIFIC EMBODIMENTS

In the following description of the specific implementation, specific embodiments of the invention will be described with reference to the appended drawings. In the drawings, the same reference numeral represents the same or similar component, or represents the same or similar steps.

Embodiment 1

Figure 2:
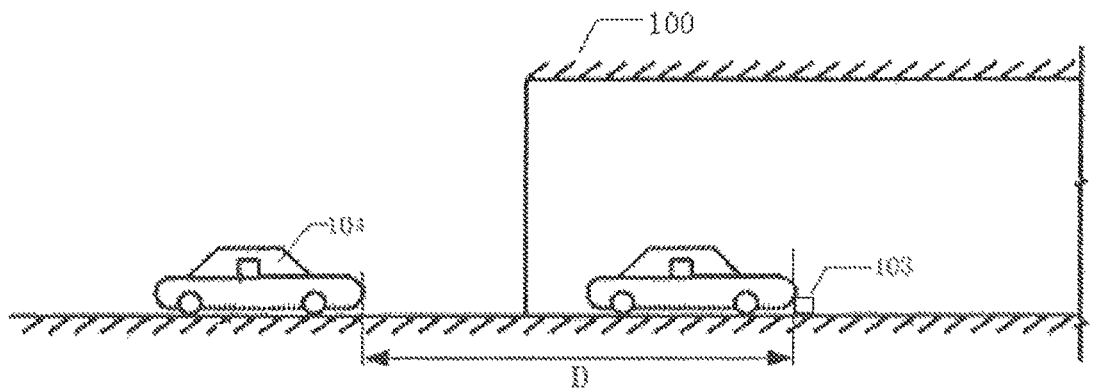
FIG. 2 is a sectional view of an embodiment of the illumination standard calculation method for a tunnel entrance section in daytime based on safe visual recognition.

An embodiment of the illumination standard calculation method for a tunnel entrance section in daytime based on safe visual recognition provided by the invention is showed in FIG. 1 and FIG. 2. The objective of the invention is to provide an illumination standard calculation method for a tunnel entrance section in daytime to calculate the ratio between the road surface brightness of the tunnel entrance section 100 and the road surface brightness outside the tunnel. i.e. the brightness reduction factor between inside and outside of the tunnel, that meets the safe visual recognition requirements in daytime under different light environments. Then, according to the driving design requirements of different tunnels, reference standards can be provided for the illumination design of tunnel entrance section and the driver's driving safety can be ensured.

The light environment of a tunnel entrance section 100 in daytime is complex. It has both natural light and artificial light. In order to characterize the light environment of the tunnel entrance section 100, color temperature, color rendering index and average road surface brightness are used as light environment parameters. A feature surface is selected to represent the light environment of the tunnel entrance section 100, and the position of the feature surface is located at the beginning of the light environment stable section of the tunnel.

According to the method of the invention, the light environment parameters of the tunnel entrance section are set first. In this embodiment, color temperature, color rendering index and average road surface brightness of the tunnel entrance section are set, as shown in FIG. 1 and FIG. 2. And a feature position 102 in the tunnel is determined. Specifically, the brightness of the tunnel is measured by a luminance meter. The brightness value of the road surface is measured at intervals of 1 m from the tunnel portal 101 to the inside of the tunnel. When the measured brightness value no longer changes, the position is recorded as the feature position 102 in the tunnel. The roadway cross-section of the feature position 102 in the tunnel is the critical cross-section of the boundary between light environments inside and outside the tunnel, and the feature section is used as the position to place the target object 103.

Then, the average brightness of a section of area at the inner side of the feature position 102 in the tunnel is used as the characteristic value of the road surface brightness. The brightness values of multiple position points 110 at horizontal intervals of 1 m between adjacent illumination devices 106 on a middle line 107 of the roadway, edge lines 108 of the roadway and lane dividing lines 109 of the roadway at the inner side of the feature position 102 are measured and recorded. The average road surface brightness is then calculated. The average road surface brightness is used as the road surface brightness characteristic value of the feature position 102 in the tunnel. In particular, the tunnel area chosen for calculating the average road surface brightness is a section of area extending in the direction toward the inside of the tunnel from the feature position 102 in the tunnel. The specific measurement distance, for example, is the distance between two adjacent illumination devices in the tunnel.

A target object is placed at the roadway cross-section of the feature position 102 in the tunnel; a driver is made to drive a vehicle 104 at different speeds into the tunnel and try to visually recognize the target object 103 inside the tunnel entrance section from the outside of the tunnel during the driving process; the visual recognition distances D required by the driver under different driving speeds, i.e. the distance to the target object when visually discovering the target object, are measured;

According to the embodiment of the invention, the driver's average eye height when sitting in the vehicle is about 1.2 m. The running speed of the driver driving the vehicle and the position of the vehicle when the target object is visually discovered is recorded by a non-contact speed meter for motor vehicle. The position is the feature position 105 outside the tunnel. The distance between the feature position 105 outside the tunnel and the feature position 102 in the tunnel, i.e. the visual recognition distance D, is measured. The method of measuring the visual recognition distance by using the non-contact speed meter is as follows: When the driver visually discovers the target object, the non-contact speed meter is triggered to record a first position. When the driver passes through the feature position 102, i.e. passes through the position of the target object, the non-contact speed meter is triggered again to record a second position. The visual recognition distance D is the difference value between the two positions.

Then, the light environment in the tunnel is set to a different brightness value. The driver drives a vehicle 104 to enter the tunnel at different speeds. In the course of driving, the target object 103 in the tunnel entrance section is visually identified from the outside of the tunnel during the driving process. The driver's visual recognition distances D are collected under different light environments and different speeds.

According to this embodiment of the invention, the adopted color rendering index is 70. Experiments show that, if the color rendering index is higher and more close to sunlight, it is more conducive to visual recognition, i.e. the higher the better. In this embodiment, a relatively lower color rendering index 70 is adopted to take into consideration the most unfavorable extreme cases. The actually produced lamps usually have a color rendering index not less than 70. Therefore, they would be better than the extreme cases of this embodiment. The values of color rendering index and color temperature in the test are selected to be the actually measured values. This is due to that the color rendering index and color temperature of a lamp after being actually installed often deviates from its factory calibration value. The measurement method of color rendering index and color temperature is similar to that of average brightness, wherein multiple points are measured and averaged to get the results.

In order to eliminate the differences between drivers, more drivers with different ages, different driving experience and different eyesight (within the normal eyesight range) are selected to drive vehicles 104 at different speeds. The above tests are repeated and multiple sets of data are obtained. After analysis, it is found that, the driver's visual perception is mainly affected by the brightness difference between the inside and the outside of the tunnel as well as the driving sensation of the driver. As a result, the correlation between the visual recognition distance towards a small target object of each tested driver and the vehicle's running speed is poor. So it is not necessary to consider the influence of the running speed. The computational model of visual recognition distance D and brightness reduction factor K can be established by using multiple sets of data, and a reasonable brightness reduction factor can be calculated by using the model.

Figure 3:
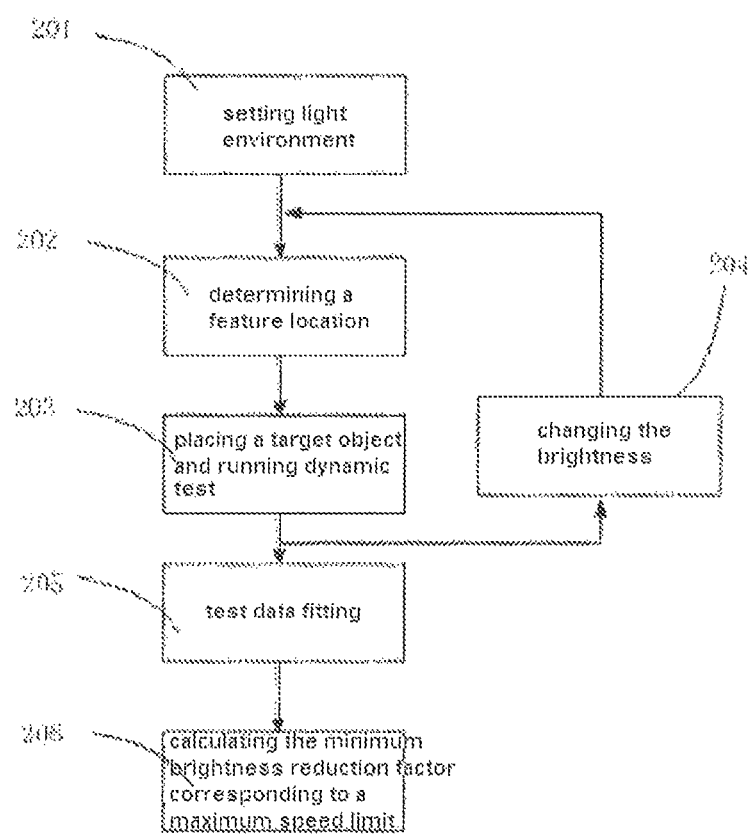
FIG. 3 is a flow chart of the illumination standard calculation method for a tunnel entrance section in daytime based on safe visual recognition.

The specific implementation steps of the illumination standard calculation method for a tunnel entrance section in daytime based on safe visual recognition of the invention are given in FIG. 3. The specific steps are as follows.

Step 201: The light environment parameters of the tunnel entrance section are set. The light environment parameters include color temperature, color rendering index and average road surface brightness. The light environment illumination in the tunnel is set at a color temperature $T_0$, a color rendering index $Ra_0$ and an average road surface brightness L. In the embodiment of the invention, a luminance spectrophotometer can be used to measure the color temperature and color rendering index. A luminance meter or an illuminometer can be used to measure the average road surface brightness L of the tunnel entrance section. While using the illuminometer, the relationship between average illumination and average brightness, i.e. the average illumination conversion coefficient, can be used to obtain the brightness.

Step 202: A feature position 102 in the tunnel is determined. The feature position 102 in the tunnel is at the critical cross-section of the boundary between light environments inside and outside the tunnel. From this feature position, the environmental brightness in the tunnel begins to remain unchanged. The average road surface brightness L of the feature position in the tunnel is measured.

According to the embodiment of the invention, the method used to determine the feature position in the tunnel is as follows: The brightness value of the road surface is measured at particular intervals (for example, 1 m) from the tunnel portal to the inside of the tunnel. When the measured brightness value no longer changes, the position point is recorded as the feature position 102 in the tunnel. The roadway cross-section of the feature position is the critical cross-section of the boundary between light environments inside and outside the tunnel.

Step 203: A target object is placed at the feature position 102 in the tunnel; a driver is made to drive a vehicle at different speeds from outside the tunnel toward the target object in the tunnel; the visual recognition distances D required for the target object 103 under different speeds are measured. For convenience of measurement, a non-contact speed meter mounted on the vehicle can be used to measure the driving speed. The actual average brightness $L_{20}$ at a 1.50 m height from the ground, directly facing the tunnel portal with a 20 degree field of vision, is measured at the safe stopping sight distance $D_0$. The brightness reduction factor K is calculated to be the ratio between L and $L_{20}$.

According to the embodiment of the invention, the driver is required to drive a vehicle 104 in a straight line from 2 km outside the tunnel toward the target object in the tunnel and to visually recognize the target object in the tunnel during the driving process. Whether the driver can quickly and easily find the target object can be used as a criterion. When the driver finds the target object, the position data of the vehicle can be collected, wherein the specific position of the vehicle 104 at this time point, i.e. the feature position 105 outside the tunnel, can be marked by triggering the non-contact speed meter mounted on the motor vehicle 104. When the vehicle 104 reaches the position of the target object 103, the specific location of the vehicle at that time point, i.e. the feature position 102 in the tunnel can be marked. The distance between the two positions is calculated as the visual recognition distance D.

Step 204: The average road surface brightness of light environment illumination in the tunnel is changed. Step 202 and Step 203 are repeated. A plurality of sets of visual recognition distances D and corresponding brightness reduction factors K associated with different average road surface brightness can be obtained.

Step 205: A Sigmoid function model is used to calculate and fit the data of the plurality of sets of visual recognition distances D and corresponding brightness reduction factors K obtained in Step 204. The BFGS method of the quasi Newton method is used to study the parameters. The relational model formula of D and K is obtained as follows:

$$D = \frac{215}{1 + e^{(-708 + 56)}} + 27.6 \quad (1)$$

Step 206: A safe stopping sight distance $D_0$ corresponding to a maximum speed limit designed for the tunnel is substituted into the above formula (1) to calculate the minimum brightness reduction factor $K_0$ required by the tunnel. The brightness value of the tunnel is set according to the minimum brightness reduction factor that meets the maximum speed limit of the tunnel obtained through the above calculation, so that the safety of driving in tunnel entrance section can be ensured.

In actual road conditions, the obstacles on the road are mostly composed of irregular polyhedrons. The minimum height of the automobile chassis from the ground varies from 0.10 m to 0.20 m. The maximum obstacle height causing vehicle overturn is 18 cm. When the obstacle height is more than 18 cm, the driver must take evasive measures. According to the most unfavorable principle and combined with recommendations in the CIE 2004 Tunnel Lighting Guide, the target object in the present embodiment of the invention adopts a gray cube with reflectivity of 20% and a 20 cm*20 cm*20 cm shape.)

Embodiment 2

Figure 4:
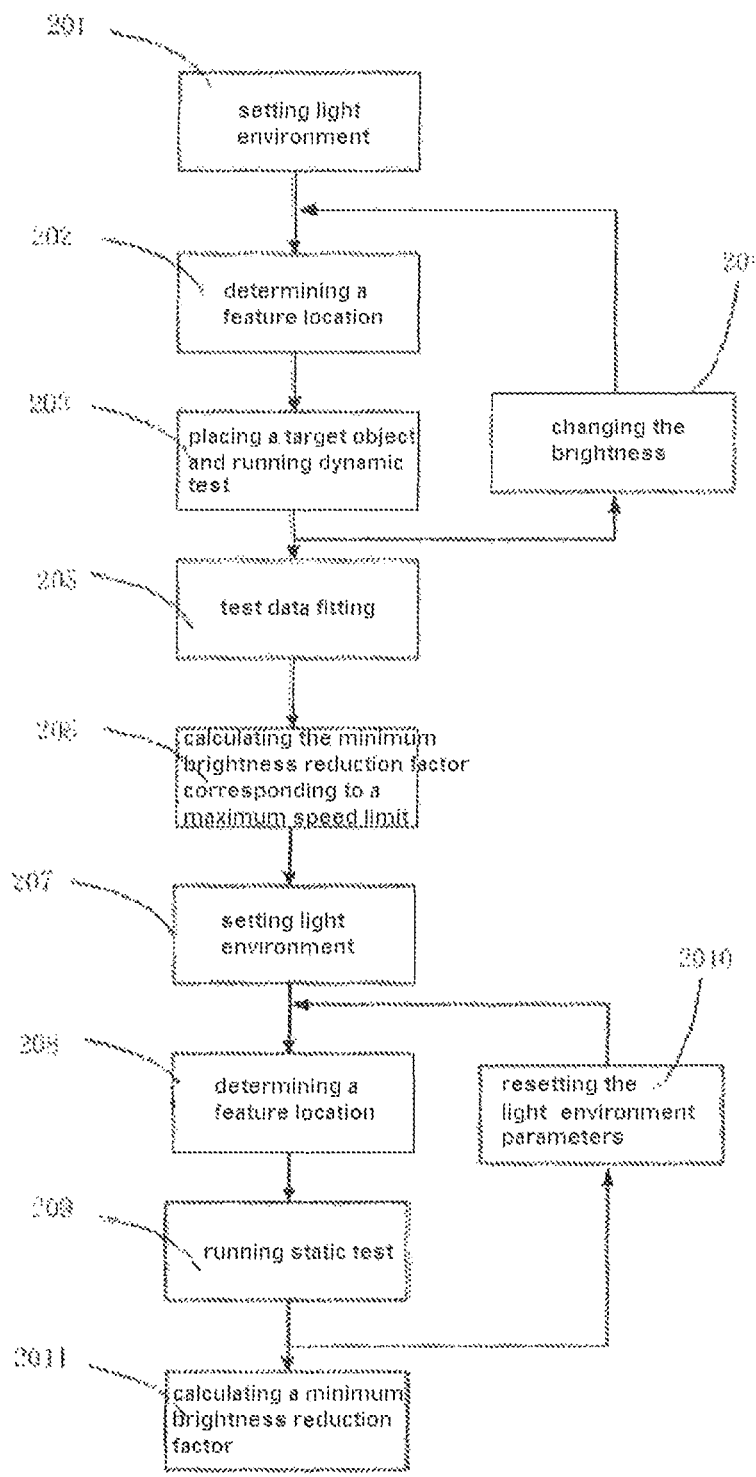
FIG. 4 is a flow chart of the illumination standard calculation method for a tunnel entrance section in daytime based on safe visual recognition.

Referring to FIG. 1, FIG. 3 and FIG. 4, based on this embodiment, minimum brightness reduction factors $K_{0d}$ of the tunnel entrance section in daytime under different light environments can be further calculated by the illumination standard calculation method for a tunnel entrance section in daytime based on safe visual recognition method of the invention. A static measurement procedure is also included. The minimum brightness reduction factor $K_0$ required for the tunnel entrance section in daytime is further calibrated. The static measurement procedure comprises the following steps:

Step 207: the light environment parameters of the tunnel are set, wherein the color temperature is set to be $T_0$ and the color rendering index is set to be $Ra_0$ for the light environment of the tunnel.

Step 208: a feature location 102 in the tunnel is determined. A target object 103 is placed at the feature 102 location in the tunnel. The vehicle is parked at a position that is spaced apart from the target object by the safe stopping sight distance $D_0$. The safe stopping sight distance $D_0$ is corresponding to the maximum speed limit designed for the tunnel.

Step 209: the driver enters the cab of the vehicle 104 for static testing. The average road surface brightness L of tunnel entrance section 100 is adjusted from small to large. The minimum static brightness value $L_f$ required by the driver to visually discover the target object 103 is recorded. Meanwhile, the actual average brightness $L_{20}$ at a 1.50 m height from the ground, directly facing the tunnel portal with a 20 degree field of vision, is measured outside the tunnel. The static minimum brightness reduction factor $K_f$ is calculated to be the ratio between L and $L_{20}$.

In the embodiment of the invention, the driver sits upright in the vehicle 104, with an eye height of 1.2 m, for example, the brightness outside the tunnel is measured by an outside tunnel brightness measuring device in the embodiment of the invention. A light intensity detector can be used as the outside tunnel brightness measuring device. The light intensity detector can be erected at the safe stopping sight distance from the tunnel portal 101, at a 1.5 m height from the ground, directly facing the tunnel portal with a 20 degree field of vision.

Step 2010: At least one of the color temperature and the color rendering index of the tunnel is reset. Step 208 and Step 209 are repeated. Static minimum brightness reduction factors $K_f$ associated with different color temperatures and color rendering indexes are obtained; the static minimum brightness reduction factor $K_f$ associated with a color temperature $T_0$ and a color rendering index $R_{a0}$ is set as benchmark J; J is compared with static minimum brightness reduction factors $K_f$ associated with different color temperatures and color rendering indexes, and the visual calibration factors a associated with different color temperatures and color rendering indexes are obtained.

Step 2011: The minimum brightness reduction factors $K_{0d}$ of the tunnel entrance section under different light environments is calculated to be an arithmetic product of a and $K_0$.

According to the embodiment of the invention, dynamic tests and static tests are carried out under different light environments. The minimum brightness reduction factors associated with different color rendering indexes and color temperatures that meets the required safe stopping sight distance $D_0$ are determined. The minimum brightness reduction factor required by the driver for safe visual recognition when driving through the tunnel in daytime is determined. Thus, a reliable standard of light environment settings is provided for safe visual recognition for safe tunnel traffic of vehicles.

Embodiment 3

The model established in Embodiment 1 of the invention can be used to calculate the brightness reduction factor based on the visual recognition distance (the distance between the vehicle 104 and the target object 103 when the driver is able to visually recognize the target object). The following is an example of a specific application of the model.

The model is used to calculate a safe brightness reduction factor K of the tunnel entrance section while the vehicle driver is driving on the freeway during the day. The freeway tunnel total length is 555 m. The design speed and maximum speed limit is 80 km/h. The color temperature of the light environment of tunnel entrance section is 5700K and the color rendering index is 70. In the tunnel, the road surface is covered with bitumninous concrete. At present, the number of driver subjects used in the field of road visual perception has not yet been unanimously agreed on internationally. In the published international papers, the number varies from 4 to 8 in general, and mounts up to 15 maximally. In this embodiment, 6 motor vehicle drivers are randomly selected. Different road surface brightness in the tunnel is measured. The driver drives a vehicle to enter the tunnel at a certain speed from outside the tunnel and tries to visually recognize the front target object 103 during the driving process. The criterion is whether the driver can quickly and easily find the target object 103. The driver's visual recognition status towards the target object 103 is recorded.

In the visual recognition process, the visual recognition information when the driver is driving on the test section and the light environment information in the tunnel are collected. According to the model of the invention, the brightness reduction factor of the tunnel entrance section in daytime is calculated. Under different brightness reduction factors of the tunnel entrance section, drivers try to visually recognize the target object in the tunnel. A total of 22 samples were collected, and the effective samples were 15, as shown in Table 1.

TABLE 1

Dynamic visual recognition results summary in daytime

| Number | Light source type | Driving speed (km/h) | brightness reduction factor | visual recognition distance (m) |
|---|---|---|---|---|
| 1 | 5700 K, 70 | 52.4 | 0.046 | 113 |
| 2 | 5700 K, 70 | 61.3 | 0.035 | 67 |
| 3 | 5700 K, 70 | 61.9 | 0.014 | 54 |
| 4 | 5700 K, 70 | 79 | 0.057 | 150 |
| 5 | 5700 K, 70 | 80.1 | 0.043 | 85 |
| 6 | 5700 K, 70 | 72.5 | 0.006 | 28 |
| 7 | 5700 K, 70 | 97.2 | 0.007 | 53 |
| 8 | 5700 K, 70 | 101.4 | 0.059 | 123 |
| 9 | 5700 K, 70 | 104.8 | 0.061 | 155 |
| 10 | 5700 K, 70 | 101.3 | 0.060 | 169 |
| 11 | 5700 K, 70 | 124 | 0.055 | 154 |
| 12 | 5700 K, 70 | 119.6 | 0.050 | 147 |
| 13 | 5700 K, 70 | 85 | 0.040 | 85 |
| 14 | 5700 K, 70 | 64 | 0.030 | 75 |
| 15 | 5700 K, 70 | 55 | 0.020 | 60 |

A sigmoid function model between the brightness reduction factor and the visual recognition distance is established. The model is $$D = \frac{215}{1 + e^{(-708 + 56)}} + 27.6.$$

The stopping sight distance D=110 m corresponding to the design maximum speed limit 80 km/h is substituted into the formula, and the minimum brightness reduction factor 0.045 is obtained. In order to ensure the safety of the tunnel entrance section during the day, the brightness reduction factor of the tunnel entrance section is recommended to be more than 0.045. If the tunnel's maximum speed limit is changed, the minimum brightness reduction factor can be obtained by using the model between the brightness reduction factor and the visual recognition distance, as shown in Table 2.

TABLE 2

Brightness reduction factor corresponding to different maximum speed limits

| | maximum speed limit (km/h) | | |
|---|---|---|---|
| | 60 | 80 | 100 |
| stopping sight distance (m) | 75 | 110 | 160 |
| brightness reduction factor | 0.033 | 0.045 | 0.06 |

Embodiment 4

Based on Embodiment 3 of the invention, the color temperature is further changed. Static visual recognition is performed and the visual calibration factor 'a' is obtained, as shown in Table 3.

TABLE 3

Visual calibration factor

| color temperature (K) | brightness reduction factor | visual calibration factor |
|---|---|---|
| 5700 | 0.0219 | 1 |
| 5500 | 0.0224 | 1.023 |
| 5000 | 0.0230 | 1.050 |
| 4500 | 0.0247 | 1.128 |
| 4000 | 0.0255 | 1.165 |
| 3500 | 0.0260 | 1.187 |

According to an embodiment of the invention, the minimum brightness reduction factors are obtained under different light environments and different maximum speed limits, as shown in Table 4. The brightness reduction factors are suitable for the free flow traffic condition.

TABLE 4 the minimum brightness reduction factors under different light environments and different maximum speed limits

| | | minimum brightness reduction factor | | |
|---|---|---|---|---|
| sequence | color temperature (K) | 60 km/h | 80 km/h | 100 km/h |
| 1 | 5700 | 0.033 | 0.045 | 0.06 |
| 2 | 5500 | 0.034 | 0.046 | 0.061 |
| 3 | 5000 | 0.035 | 0.047 | 0.063 |
| 4 | 4500 | 0.037 | 0.051 | 0.068 |
| 5 | 4000 | 0.038 | 0.052 | 0.070 |
| 6 | 3500 | 0.039 | 0.053 | 0.071 |

Embodiment 5

The invention also provides a system for implementing the illumination standard calculation method for a tunnel entrance section in daytime based on safe visual recognition. The system includes a tunnel entrance subsystem that comprises illumination devices with adjustable output power installed at the tunnel entrance section 100 for setting the tunnel light environment; a test subsystem that comprises a motor vehicle 104, a target object 103, an inside tunnel brightness measuring device, an outside tunnel brightness measuring device, a color temperature measuring device, a color rendering index measuring device, a speed measuring device, and a distance measuring device, for dynamic testing and static testing with data collection; a data computing subsystem that comprises a computer system for fitting and processing of the collected data.

In the embodiment of the invention, the illumination devices can be set to be a variety of lighting fixtures in the tunnel entrance subsystem. The light environment parameters such as the color temperature, color rendering index and brightness can be adjusted by the lighting fixtures. In order to simplify the measurement process, the color temperature measuring device and the color rendering index measuring device is a luminance spectrophotometer. The distance measuring device and the speed measuring device are integrated into a non-contact speed meter, so as to simplify the system. The inside tunnel road surface brightness measuring device is a luminance meter or an illuminometer. While using the illuminometer, the brightness is obtained by using the relationship between average brightness and average illumination, i.e. the average illumination conversion coefficient.

The field of vision of a small passenger car is narrower than the field of vision of a large bus. Under the same environment, drivers in a small passenger car are more difficult to visually recognize the target object 103. In the embodiment of the invention, a small passenger car is selected as the test vehicle 104 according to the most unfavorable principle.

In order to measure brightness outside the tunnel more effectively and make the measured data more representative, the outside tunnel brightness measuring device in the embodiment of the invention can be erected at the safe stopping sight distance $D_0$ from the tunnel portal, at a 1.5 m height from the ground, directly facing the tunnel portal with a 20 degree field of vision. The brightness measuring device can be a light intensity detector, and also can be a luminance meter or other instruments.

The present invention not only takes into consideration the light environment information in the tunnel, but also takes into consideration the dynamic factors of the driver. The minimum brightness reduction factor of the tunnel entrance section in daytime can be effectively calculated by using the calculation method of the present invention, which not only improves the driving safety at the tunnel entrance section in daytime, but also provides reference basis for energy-saving operation of tunnel illumination and safety study of roadway traffic.

The drawings are only schematic and not to scale. Although the present invention has been described in combination with preferred embodiments, it should be understood that the protection scope of the present invention is not limited to the embodiments described herein.

Combined with the explanation and implementation of the present invention disclosed herein, other embodiments of the present invention are easy to contemplate and understand for those skilled in the art. The description and embodiments are considered to be exemplary. The true scope and main concept of the present invention are defined by the appended claims.

The invention claimed is:

1. An illumination standard calculation method for a tunnel and the tunnel's entrance section in daytime based on safe visual recognition, comprising the following steps:
   (a) setting light environment parameters of the tunnel entrance section, including setting a color temperature in the tunnel to be $T_0$ and setting color rendering index to be $R_{a0}$;
   (b) determining a feature location in the tunnel where a brightness value of road surface in the tunnel begins to remain constant, and measuring an average road surface brightness L of the feature location in the tunnel;
   (c) placing a target object at the feature location in the tunnel, making a driver drive at different speeds from outside the tunnel toward the target object to measure a visual recognition distance D required by the driver to visually discover the target object under different driving speeds, and measuring a brightness $L_{20}$ outside the tunnel at a position where the driver visually discovers the target object and calculating a brightness reduction factor K to be the ratio between L and $L_{20}$;
   (d) resetting the average road surface brightness L of the tunnel entrance section and repeating the steps (b) and (c) to obtain a plurality of different sets of visual recognition distances D and corresponding brightness reduction factors K associated with different average road surface brightness;
   (e) based on the obtained plurality of sets of visual recognition distances D and corresponding brightness reduction factors K, using a Sigmoid function model to calculate and fit the data of the plurality of sets of D and K to obtain a relational model formula of D and K to be $$D = \frac{215}{1 + e^{(-708+56)}} + 27.6;$$

(f) substituting a safe stopping sight distance $D_0$ corresponding to a maximum speed limit designed for the tunnel into the formula to obtain a minimum brightness reduction factor $K_0$ of the tunnel entrance section in daytime.

2. The method of claim 1, wherein, after the step (f), the method further comprises the following steps for further calibrating the minimum brightness reduction factor $K_0$ required for the tunnel entrance section in daytime:
   (g) setting the color temperature of the tunnel entrance section to be $T_0$ and setting the color rendering index to be $R_{a0}$;
   (h) determining a feature location in the tunnel where a brightness value of road surface in the tunnel begins to remain constant, placing a target object at the feature location in the tunnel, and parking a motor vehicle at a position that is spaced apart from the target object by the safe stopping sight distance $D_0$;
   (i) letting a driver enter a cab of the motor vehicle, adjusting the average road surface brightness L of the tunnel entrance section from small to large, recording a minimum static brightness value $L_f$ required by the driver to visually discover the target object, and measuring the brightness $L_{20}$ outside the tunnel at the safe stopping sight distance $D_0$ and calculating a static minimum brightness reduction factor $K_f$ to be the ratio between $L_f$ and $L_{20}$;

(j) resetting at least one of the color temperature or the color rendering index of the tunnel entrance section and repeating the steps (h) and (i) to obtain the static minimum brightness reduction factors $K_f$ associated with different color temperatures and color rendering indexes, setting the static minimum brightness reduction factor $K_f$ associated with a color temperature $T_0$ and a color rendering index $R_{a0}$ as benchmark J, comparing J with static minimum brightness reduction factors $K_f$ associated with different color temperatures and color rendering indexes to obtain visual calibration factors a associated with different color temperatures and color rendering indexes, and calculating minimum brightness reduction factors $K_{0d}$ of the tunnel entrance section under different light environments to be an arithmetic product of a and $K_0$.

3. The method of claim 1, wherein, in order to determine the feature location in the tunnel, the brightness value of road surface is measured at intervals of 1 m from a tunnel portal to inside the tunnel, and a location point from which the measured brightness value no longer changes is recorded as the feature location in the tunnel; the target object is placed at a roadway cross-section of the feature location in the tunnel or a critical cross-section of a light environment boundary.

4. The method of claim 1, wherein, the average road surface brightness of the tunnel entrance section is an average value of road surface brightness of a section of area at an inner side of the feature location in the tunnel.

5. The method of claim 1, wherein, the step of measuring the brightness $L_{20}$ outside the tunnel comprises: erecting a brightness measuring device at the safe stopping sight distance $D_0$ from a tunnel portal, at a 1.5 m height from the ground, directly facing the tunnel portal with a 20 degree field of vision, and thereby measuring the brightness $L_{20}$ outside the tunnel.

6. The method of claim 1, wherein, the step of measuring the visual recognition distance D comprises: by using a non-contact speed meter mounted on a motor vehicle, when the driver visually discovers the target object, the non-contact speed meter is triggered to record a first position; when the driver reaches the position of the target object, a second position is recorded, and the visual recognition distance D is the distance between the two positions.

7. The method of claim 1, wherein, a luminance spectrophotometer is used to measure the color temperature and the color rendering index; a luminance meter or an illuminometer is used to measure the average road surface brightness L of the tunnel entrance section, wherein the relationship between average illumination and average brightness is used to calculate the brightness; a light intensity detector is used to measure the brightness $L_{20}$ outside the tunnel.

8. The method of claim 1, wherein, drivers with different ages, different driving experience and different normal eyesight are selected as test subjects.

9. A system configured to execute the method of claim 1, the system comprising a tunnel entrance subsystem, a test subsystem and a data computing subsystem:

the tunnel entrance subsystem comprises illumination devices with adjustable output power installed at a tunnel entrance section for setting a tunnel light environment, wherein the illumination devices are configured to
  (i) set light environment parameters of the tunnel entrance section, including setting a color temperature in the tunnel to be $T_0$ and setting color rendering index to be $R_{a0}$;

the test subsystem comprises a motor vehicle, a target object, an inside tunnel brightness measuring device, an outside tunnel brightness measuring device, a color temperature measuring device, a color rendering index measuring device, a speed measuring device, and a distance measuring device, for dynamic testing and static testing with data collection, wherein the inside tunnel brightness measuring device and the outside tunnel brightness measuring device are configured to
  (ii) determine a feature location in the tunnel where a brightness value of road surface in the tunnel begins to remain constant, and measure an average road surface brightness L of the feature location in the tunnel;
wherein the speed measuring device and the distance measuring device are configured to
  (iii) measure a visual recognition distance D required by the driver to visually discover the target object under different driving speeds after placing a target object at the feature location in the tunnel and making a driver drive at different speeds from outside the tunnel toward the target object;
wherein the inside tunnel brightness measuring device and the outside tunnel brightness measuring device are further configured to
  (iv) measure a brightness $L_{20}$ outside the tunnel at a position where the driver visually discovers the target object, and calculate a brightness reduction factor K to be the ratio between L and $L_{20}$;
wherein the illumination devices, the inside tunnel brightness measuring device, the outside tunnel brightness measuring device, the speed measuring device and the distance measuring device are further configured to
  (v) reset the average road surface brightness L of the tunnel entrance section, and repeat the operations of (ii), (iii) and (iv) to obtain a plurality of different sets of visual recognition distances D and corresponding brightness reduction factors K associated with different average road surface brightness;
the data computing subsystem comprises a computer for fitting and processing of the collected data, wherein the computer is configured to
  (vi) use a Sigmoid function model to calculate and fit the data of the obtained plurality of sets of visual recognition distances D and corresponding brightness reduction factors K to obtain a relational model formula of D and K to be $$D = \frac{215}{1 + e^{(-708+56)}} + 27.6;$$

(vii) substitute a safe stopping sight distance $D_0$ corresponding to a maximum speed limit designed for the tunnel into the formula to obtain a minimum brightness reduction factor $K_0$ of the tunnel entrance section in daytime.

10. The system of claim 9, wherein,
in the tunnel entrance subsystem, the illumination devices are set to be a variety of lighting fixtures for adjusting the light environment parameters such as color temperature and color rendering index;
in the test subsystem, the color temperature measuring device and color rendering index measuring device is a luminance spectrophotometer, the inside tunnel road surface brightness measuring device is a luminance meter or an illuminometer, the motor vehicle is a small passenger car, the distance measuring device and the speed measuring device are respectively a non-contact speed meter;

the tunnel entrance subsystem includes a tunnel portal, the outside tunnel brightness measuring device is located at the safe stopping sight distance $D_0$ from the tunnel portal, at a 1.5 m height from the ground, directly facing the tunnel portal with a 20 degree field of vision, and the outside tunnel brightness measuring device is a light intensity detector.

\* \* \* \* \*